US011626600B2

(12) United States Patent
Mitani et al.

(10) Patent No.: US 11,626,600 B2
(45) Date of Patent: Apr. 11, 2023

(54) FUEL CELL SYSTEM

(71) Applicant: HONDA MOTOR CO., LTD., Tokyo (JP)

(72) Inventors: Manabu Mitani, Wako (JP); Ryoichi Yoshitomi, Wako (JP); Hiroyasu Ozaki, Wako (JP); Toshinobu Mito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 274 days.

(21) Appl. No.: 17/202,831

(22) Filed: Mar. 16, 2021

(65) Prior Publication Data

US 2021/0296665 A1  Sep. 23, 2021

(30) Foreign Application Priority Data

Mar. 17, 2020 (JP) .............................. JP2020-046058

(51) Int. Cl.
| | |
|---|---|
| *H01M 8/04082* | (2016.01) |
| *H01M 8/04089* | (2016.01) |
| *H01M 8/2475* | (2016.01) |

(52) U.S. Cl.
CPC .... *H01M 8/04201* (2013.01); *H01M 8/04089* (2013.01); *H01M 8/2475* (2013.01); *H01M 2250/20* (2013.01)

(58) Field of Classification Search
CPC ........... H01M 8/04082–04201; H01M 8/2475; H01M 8/2465–2484; H01M 8/04089; Y02T 90/40
See application file for complete search history.

(56) References Cited

U.S. PATENT DOCUMENTS

| | | | | |
|---|---|---|---|---|
| 2007/0231621 A1* | 10/2007 | Rosal | ................ | H01M 8/04201 429/444 |
| 2010/0186836 A1* | 7/2010 | Yoshihiro | ......... | H01M 8/04201 137/614.05 |
| 2013/0130143 A1* | 5/2013 | Baur | ....................... | F16L 53/38 29/745 |
| 2017/0113531 A1 | 4/2017 | Imamura et al. | | |

FOREIGN PATENT DOCUMENTS

JP         6496233 B2    4/2019

* cited by examiner

*Primary Examiner* — Milton I Cano
*Assistant Examiner* — Mary G Henshaw
(74) *Attorney, Agent, or Firm* — Carrier Shende & Associates, P.C.; Joseph P. Carrier; Fulchand P. Shende

(57) ABSTRACT

A reactant gas channel part provided outside an auxiliary machinery case of a fuel cell system is connected to a case through hole. A plurality of channel seal members are provided between the auxiliary machinery case and the reactant gas channel part, where the channel seal members are arranged side by side in the radial direction of the case through hole and surround the case through hole. The reactant gas channel part has an opposing surface that faces a surrounding portion of the auxiliary machinery case that surrounds the case through hole. The channel seal members include an inner seal member abutting on the opposing surface and an outer seal member disposed radially outside of it. A connection channel communicating with an internal space of the auxiliary machinery case is formed between the inner seal member and the outer seal member.

4 Claims, 9 Drawing Sheets

FUEL CELL SYSTEM

CROSS-REFERENCE TO RELATED APPLICATION

This application is based upon and claims the benefit of priority from Japanese Patent Application No. 2020-046058 filed on Mar. 17, 2020, the contents of which are incorporated herein by reference.

BACKGROUND OF THE INVENTION

Field of the Invention

The present invention relates to a fuel cell system which includes a stack of a plurality of power generation cells that generate electric power through electrochemical reactions between fuel gas and oxygen-containing gas, and a case accommodating at least one of the stack and the auxiliary machinery that operates with the fuel cells.

Description of the Related Art

For example, a solid polymer electrolyte fuel cell includes a membrane electrode assembly (MEA) in which an anode is formed on one side of an electrolyte membrane formed of a polymer ion exchange membrane, and a cathode is formed on the other side. The membrane electrode assembly is sandwiched between separators from both sides to constitute a power generation cell, and a plurality of power generation cells are stacked together to constitute a stacked body. Fuel gas, which contains hydrogen, and oxidizing gas, which contains oxygen, are passed through the stacked body to cause electrochemical reactions in the individual power generation cells, to thereby generate electric power.

For example, a stack of this kind forms a fuel cell system together with auxiliary machinery for use with the fuel cells, a case, and so on. The fuel cells' auxiliary machinery includes various constituent components to, e.g., pass the oxygen-containing gas and fuel gas through the stack while controlling their flow rates, temperatures, pressures, water contents, etc. The case accommodates at least one of the stack and the fuel cells' auxiliary machinery. Further, the inside of the case communicates with an exhaust duct so that, when the fuel gas leaks from the stack, fuel cells' auxiliary machinery, etc., the leaked fuel gas can be guided and discharged to a given place (for example, refer to Japanese Patent No. 6496233). Thus, it is possible, by accommodating the leaked fuel gas inside the case, to reduce accumulation of the leaked fuel gas in the space where the fuel cell system is installed, e.g. in the interior of a fuel cell vehicle.

SUMMARY OF THE INVENTION

A case constructed as mentioned above further has case through holes formed in its outer wall surface, and reactant gas channel parts are connected respectively to the case through holes. The reactant gas channel parts are provided outside of the case, which include, for example, piping and devices that form part of the reactant gas channels configured to allow reactant gases to flow as oxygen-containing gas and fuel gas before being supplied to the stack or after being discharged from the stack.

In such a fuel cell system, the fuel gas may be present inside any reactant gas channel part, irrespective of whether the reactant gas channel part constitutes a reactant gas channel for the fuel gas or a reactant gas channel for the oxygen-containing gas. It is therefore necessary to prevent the reactant gases (especially, the fuel gas) inside the reactant gas channel parts from leaking out of the case etc. through the connections between the reactant gas channel parts and the case. Possible measures to be taken for this purpose may include further providing the case with additional cover means to shield the connections between the reactant gas channel parts and the case, which, however, will increase the size and weight of the case.

The present invention has been made considering such a problem, and an object of the invention is to provide a fuel cell system capable of preventing leakage of the reactant gases from connections between the reactant gas channel parts and the case, without increasing the size of the case.

In order to achieve the object, the invention is directed to a fuel cell system including a stack of a plurality of power generation cells for generating electric power through an electrochemical reaction between a fuel gas and an oxygen-containing gas, and a case for accommodating at least one of the stack and the fuel cells' auxiliary machinery, where the case has a case through hole formed to penetrate through a wall of the case. The fuel cell system includes: a reactant gas channel part provided outside of the case, the reactant gas channel part being connected to the case through hole and forming a reactant gas channel for a reactant gas being the fuel gas or the oxygen-containing gas; and a plurality of channel seal members disposed side by side in a radial direction of the case through hole between the case and the reactant gas channel part, and surrounding the case through hole. The reactant gas channel part has an opposing surface that faces a surrounding portion of an outer wall surface of the case that surrounds the case through hole, and the plurality of channel seal members include an inner seal member abutting on the opposing surface and an outer seal member disposed on an outer side of the inner seal member in the radial direction to abut on the opposing surface. A connection channel is formed between the inner seal member and the outer seal member in a manner that the connection channel communicates with an internal space of the case.

According to this fuel cell system, the plurality of channel seal members are arranged radially side by side between the surrounding portion of the case and the opposing surface of the reactant gas channel part, and the plurality of channel seal members seal the connection between the case and the reactant gas channel part. Further, the plurality of channel seal members include the inner seal member disposed closer to the case through hole in the radial direction thereof, and the outer seal member disposed on the outer side of the radial direction (farther from the case through hole) at an interval from the inner seal member. Furthermore, the connection channel communicating with the internal space of the case is formed between the inner seal member and the outer seal member.

The presence of the plurality of seal members effectively prevents the reactant gas in the reactant gas channel from leaking from the connection between the case and the reactant gas channel part. Furthermore, for example, even if the sealing function of the inner seal member is damaged and the reactant gas in the reactant gas channel flows past the inner seal member toward the outer seal member, the reactant gas can be guided out into the internal space of the case through the connection channel. That is, it is possible to effectively prevent the reactant gas from further flowing past the outer seal member to leak out of the connection.

In this way, the fuel cell system can prevent reactant gas from leaking from the connection between the reactant gas channel part and the case, without the need to additionally providing the case with some cover means for shielding the connection between the case and the reactant gas channel part, that is, without increasing the size of the case.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Figure 1:
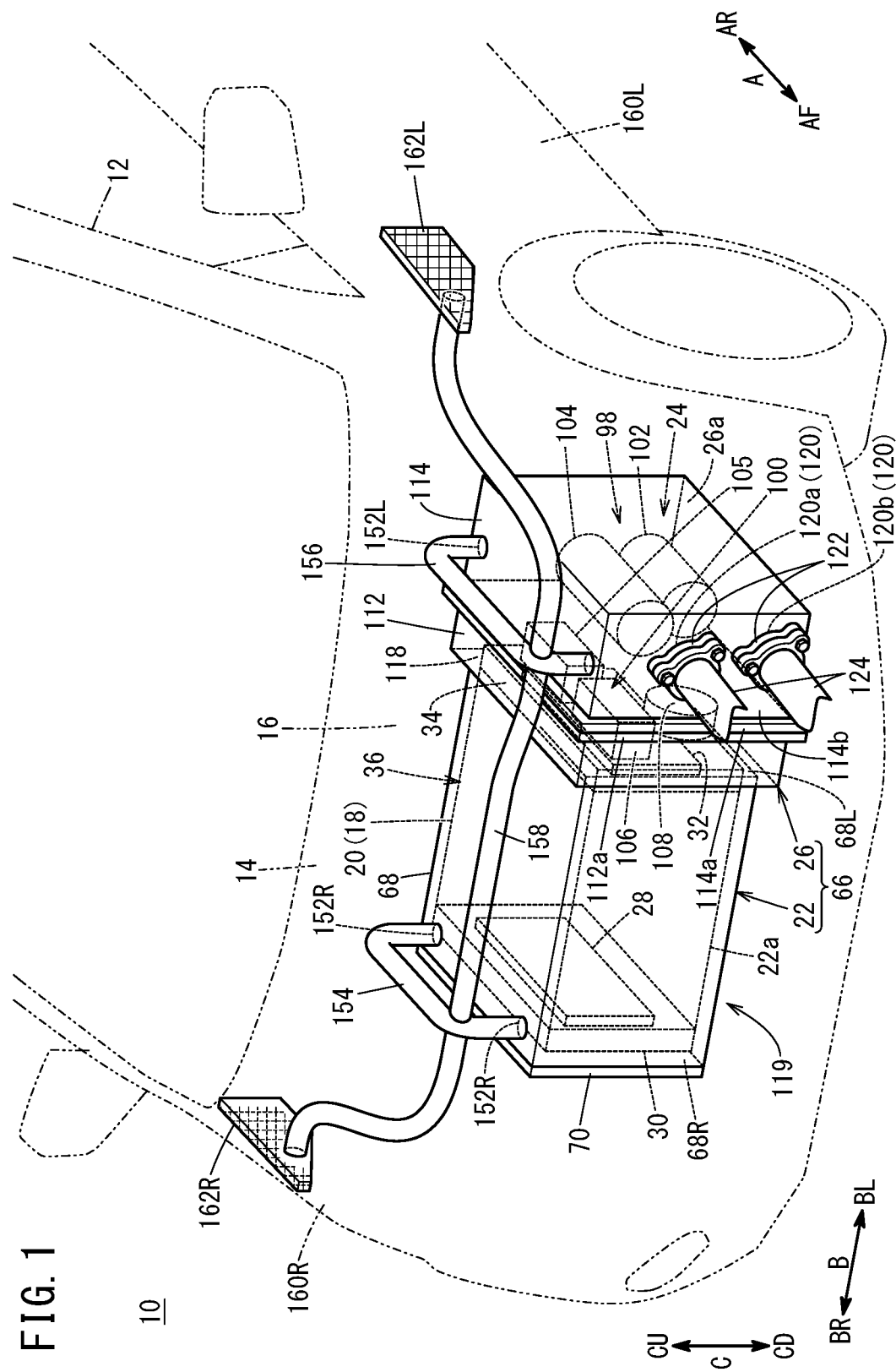
FIG. 1 is a schematic perspective view of a fuel cell vehicle equipped with a fuel cell system according to an embodiment of the invention.

The fuel cell system according to the present invention will be described in detail in connection with preferred embodiments while referring to the accompanying drawings. In the drawings, constituent elements that offer identical or similar functions and effects will be labeled using the same reference numerals and may not be described repeatedly.

As shown in FIG. 1, an embodiment will describe an example in which a fuel cell system 10 is installed in a fuel cell vehicle 12 that is a fuel cell electric automobile. However, the invention is not particularly limited to this example, but the fuel cell system 10 can be installed and used in various devices and equipment (not shown). In the following description, unless otherwise specified, the front-rear direction (arrow A direction), left-right direction (arrow B direction), and up-down direction (vertical direction, arrow C direction) will be explained on the basis of the directions seen from an occupant (not shown) seated on the driver's seat in the fuel cell vehicle 12.

As shown in FIG. 1, the fuel cell system 10 is installed in a front room (motor room) 16 formed in the front (arrow AF side) of a dashboard 14 of the fuel cell vehicle 12. The fuel cell system 10 includes a stack 20 in which a plurality of power generation cells 18 (FIG. 2) are stacked in the left-right direction (arrow B direction), a stack case 22 accommodating the stack 20, and an auxiliary machinery case 26 (case) accommodating the fuel cells' auxiliary machinery 24.

In this embodiment, the fuel cell system 10 is arranged so that the stacking direction of the stack 20 extends along the left-right direction (arrow B direction, horizontal direction) in the fuel cell vehicle 12. However, the arrangement is not limited to this example but, for example, the fuel cell system 10 may be arranged in the fuel cell vehicle 12 so that the stacking direction of the stack 20 extends along the front-back direction (arrow A direction, horizontal direction).

As shown in FIG. 1, at the right end of the stacking direction of the stack 20 (on the arrow BR side), a first terminal plate 28 and a first insulation plate 30 are stacked in this order in the outward direction. At the left end of the stacking direction of the stack 20 (on the arrow BL side), a second terminal plate 32 and a second insulation plate 34 are stacked in order in the outward direction. The structure in which the stack 20, the first terminal plate 28 and second terminal plate 32, and the first insulation plate 30 and second insulation plate 34, are stacked in this manner will hereinafter be referred to also as a sandwiched body 36.

Figure 2:
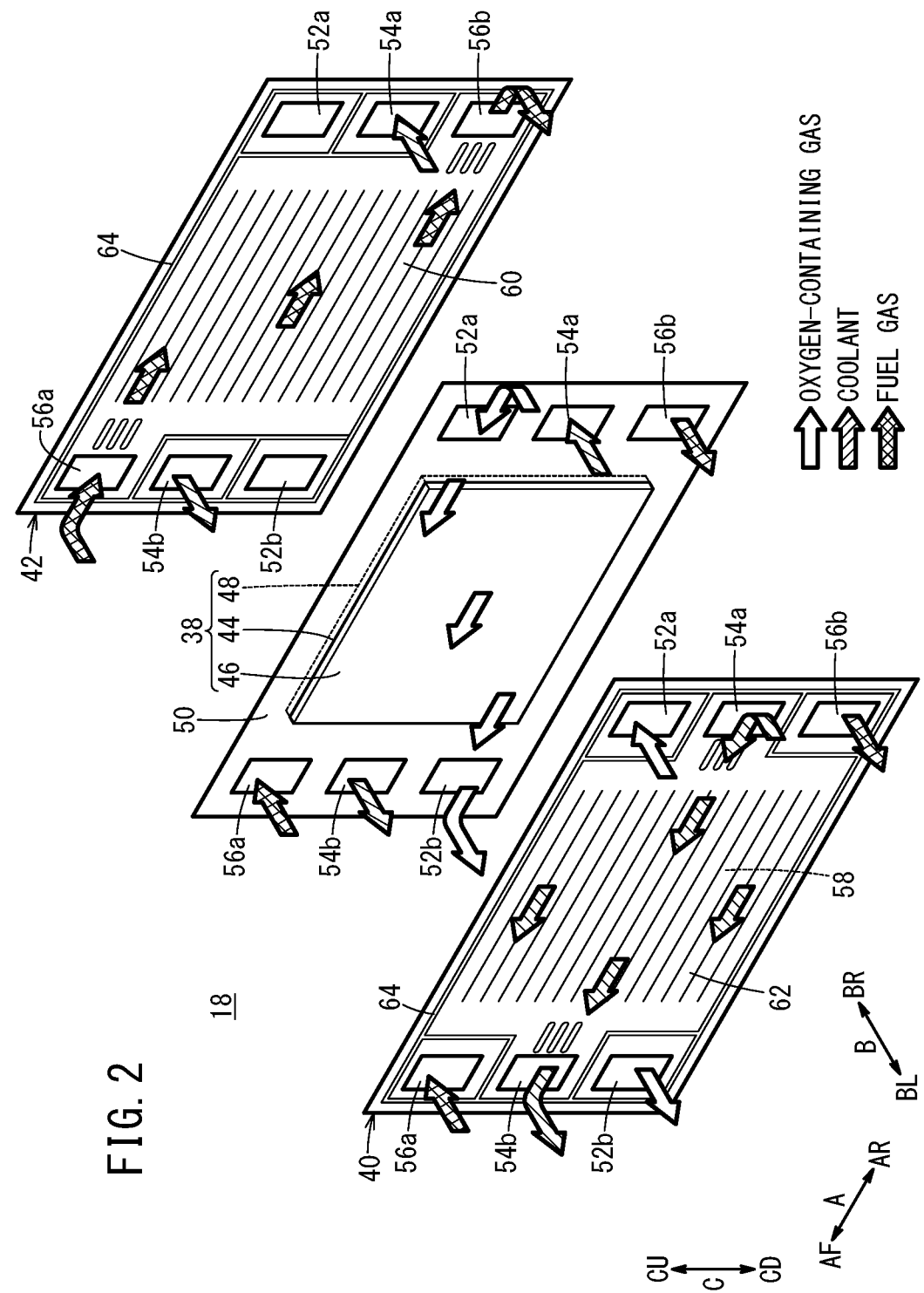
FIG. 2 is an exploded perspective view of a power generation cell.

As shown in FIG. 2, each power generation cell 18 includes a membrane electrode assembly 38, and a first separator 40 and a second separator 42 sandwiching the membrane electrode assembly 38 from both sides. The membrane electrode assembly 38 includes an electrolyte membrane 44, and a cathode 46 and an anode 48 sandwiching the electrolyte membrane 44. The membrane electrode assembly 38 is provided with a film-like resin frame member 50 placed along its entire periphery. The first separator 40 and the second separator 42 are metal separators or carbon separators.

At one end of the longitudinal direction (arrow A direction) of the rectangular power generation cell 18 (at the end on the arrow AR side), an oxygen-containing gas inlet passage 52a, a coolant inlet passage 54a, and a fuel gas outlet passage 56b are arranged vertically side by side (along the arrow C direction) in such a manner that each passage communicates in the stacking direction (arrow B direction). An oxygen-containing gas, for example, is supplied as oxidizing gas into the oxygen-containing gas inlet passage 52a. A coolant is supplied into the coolant inlet passage 54a. A fuel gas, e.g. a hydrogen-containing gas, is discharged from the fuel gas outlet passage 56b. The oxygen-containing gas and fuel gas will hereinafter be collectively referred to also as reactant gases.

At the other end (at the end on the arrow AF side) of the longitudinal direction of the power generation cell 18, a fuel gas inlet passage 56a into which the fuel gas is supplied, a coolant outlet passage 54b for discharging the coolant, and an oxygen-containing gas outlet passage 52b for discharging the oxygen-containing gas, are arranged vertically side by side, in such a manner that each passage communicates in the stacking direction.

On the side of the first separator 40 that faces the membrane electrode assembly 38, an oxygen-containing gas flow field 58 is formed to communicate with the oxygen-containing gas inlet passage 52a and oxygen-containing gas outlet passage 52b. On the side of the second separator 42 that faces the membrane electrode assembly 38, a fuel gas flow field 60 is formed to communicate with the fuel gas inlet passage 56a and fuel gas outlet passage 56b.

Between the first separator 40 and the second separator 42 of adjacent power generation cells 18, a coolant flow field 62 is formed to communicate with the coolant inlet passage 54a and coolant outlet passage 54b. The first separator 40 and the second separator 42 are each provided with an elastic, separator seal member 64 integrally or separately, which abuts on the resin frame member 50. The separator seal member 64 may be replaced by bead sealing (not shown) that protrudes toward the resin frame member 50, where the bead sealing is integrally formed by press molding on the first separator 40 and the second separator 42.

As shown in FIG. 1, the stack case 22 and the auxiliary machinery case 26 are joined together so that they adjoin in the left-right direction (arrow B direction) to constitute a case unit 66. The case unit 66 is substantially rectangular in plan view, whose longer side extends along the vehicle's width direction (the stacking direction of the stack 20, or the arrow B direction).

The stack case 22 includes a surrounding wall case 68 covering the peripheral surfaces of the sandwiched body 36, and an end plate 70 that abuts on the right end of the sandwiched body 36 through a right-hand opening 68R formed at the right end (arrow BR side) of the surrounding wall case 68. The end plate 70 is bolted to the surrounding wall case 68 to close the right-hand opening 68R. A seal member (not shown) is interposed along the periphery of the right-hand opening 68R, between the surrounding wall case 68 and the end plate 70. The end plate 70 is a rectangular plate whose longitudinal direction extends along the front-rear direction (arrow A direction).

Figure 3:
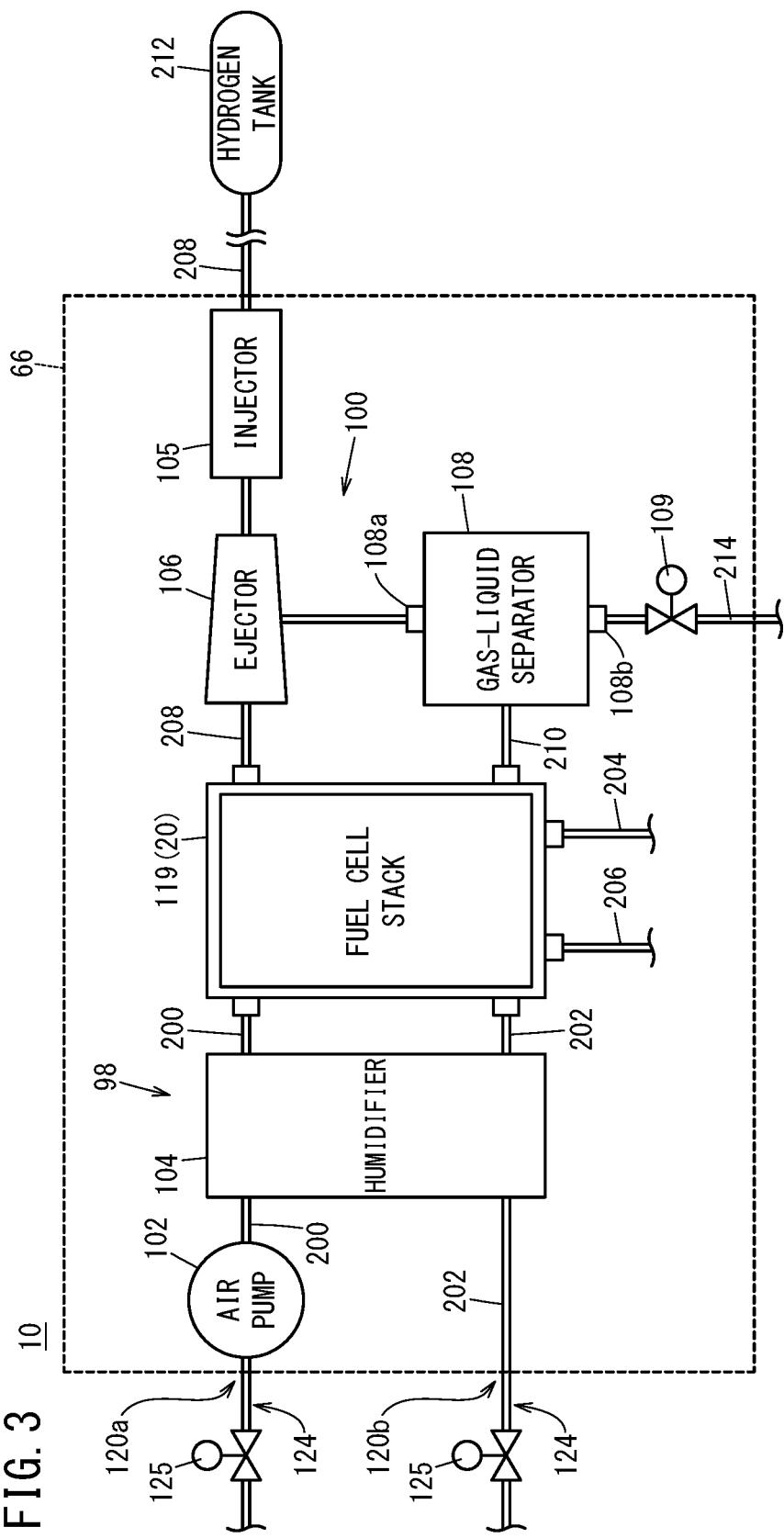
FIG. 3 is a schematic block diagram illustrating a configuration of the fuel cell system of FIG. 1.

As shown in FIG. 1, the auxiliary machinery case 26 is a protective case for accommodating and protecting the fuel cells' auxiliary machinery 24. The auxiliary machinery case 26 accommodates devices 98 relating to the oxygen-containing gas and devices 100 relating to the fuel gas, as the fuel cell's auxiliary machinery 24. As shown in FIGS. 1 and 3, the oxygen-containing-gas-related devices 98 include an air pump 102, a humidifier 104, and so on. The fuel-gas-related devices 100 include an injector 105, an ejector 106, a gas-liquid separator 108 of FIG. 3, a drain valve 109 of FIG. 3, and so on. The fuel-gas-related devices 100 may include a hydrogen pump not shown.

As shown in FIG. 1, the auxiliary machinery case 26 includes a box-like first case member 112 and second case member 114, each of which has an opening at one end and a flange 112a, 114a extending along the edge of the opening. The first case member 112 and the second case member 114 are joined together by bolting their respective flanges 112a, 114a together. Thus, an internal space 26a of the auxiliary machinery case 26, in which the fuel cells' auxiliary machinery 24 is accommodated, is formed between the first case member 112 and the second case member 114 joined together in this way.

At the right end (on the arrow BR side) of the first case member 112, a partition wall 118 is provided to close a left-hand opening 68L of the surrounding wall case 68, where the partition wall 118 is bolted to the left end (arrow BL side) of the surrounding wall case 68. The partition wall 118 of the auxiliary machinery case 26 functions also as an end plate. Accordingly, the partition wall 118 abuts on the left end (arrow BL side) of the sandwiched body 36 inside the surrounding wall case 68 through the left-hand opening 68L, and it applies a fastening load in the stacking direction to the sandwiched body 36 together with the end plate 70. The sandwiched body 36 is thus held between the end plate 70 and the partition wall 118 to form a fuel cell stack 119.

In the case unit 66, an internal space 22a of the stack case 22 accommodating the sandwiched body 36 (stack 20) is formed on the right-hand side of the partition wall 118, and the internal space 26a of the auxiliary machinery case 26 accommodating the fuel cells' auxiliary machinery 24 is formed on the left-hand side of the partition wall 118. The internal space 22a of the stack case 22 and the internal space 26a of the auxiliary machinery case 26 communicate with each other through a ventilation hole (not shown) formed in the partition wall 118.

The partition wall 118 further has formed therein a plurality of piping openings (not shown) in positions respectively facing the passages that are formed in the stack 20 (fuel cell stack 119) as shown in FIG. 2 (oxygen-containing gas inlet passage 52a, oxygen-containing gas outlet passage 52b, coolant inlet passage 54a, coolant outlet passage 54b, fuel gas inlet passage 56a, fuel gas outlet passage 56b). Connected to the piping openings are pipes (not shown) that respectively constitute, as shown in FIG. 3, an oxygen-containing gas supply channel 200, an oxygen-containing gas discharge channel 202, a coolant supply channel 204, a coolant discharge channel 206, a fuel gas supply channel 208, and a fuel gas discharge channel 210.

The oxygen-containing gas is supplied into the oxygen-containing gas inlet passage 52a of FIG. 2 through the oxygen-containing gas supply channel 200 of FIG. 3. The oxygen-containing gas in which oxygen has been consumed in the stack 20 (exhaust oxygen-containing gas) is discharged from the oxygen-containing gas outlet passage 52b of FIG. 2 into the oxygen-containing gas discharge channel 202 of FIG. 3. The coolant is supplied into the coolant inlet passage 54a of FIG. 2 through the coolant supply channel 204 of FIG. 3. The coolant after having exchanged heat with the stack 20 is discharged from the coolant outlet passage 54b of FIG. 2 into the coolant discharge channel 206 of FIG. 3. The fuel gas is supplied into the fuel gas inlet passage 56a of FIG. 2 through the fuel gas supply channel 208 of FIG. 3. The fuel gas not consumed in the stack 20 (exhaust fuel gas) is discharged from the fuel gas outlet passage 56b of FIG. 2 into the fuel gas discharge channel 210 of FIG. 3.

Figure 4:
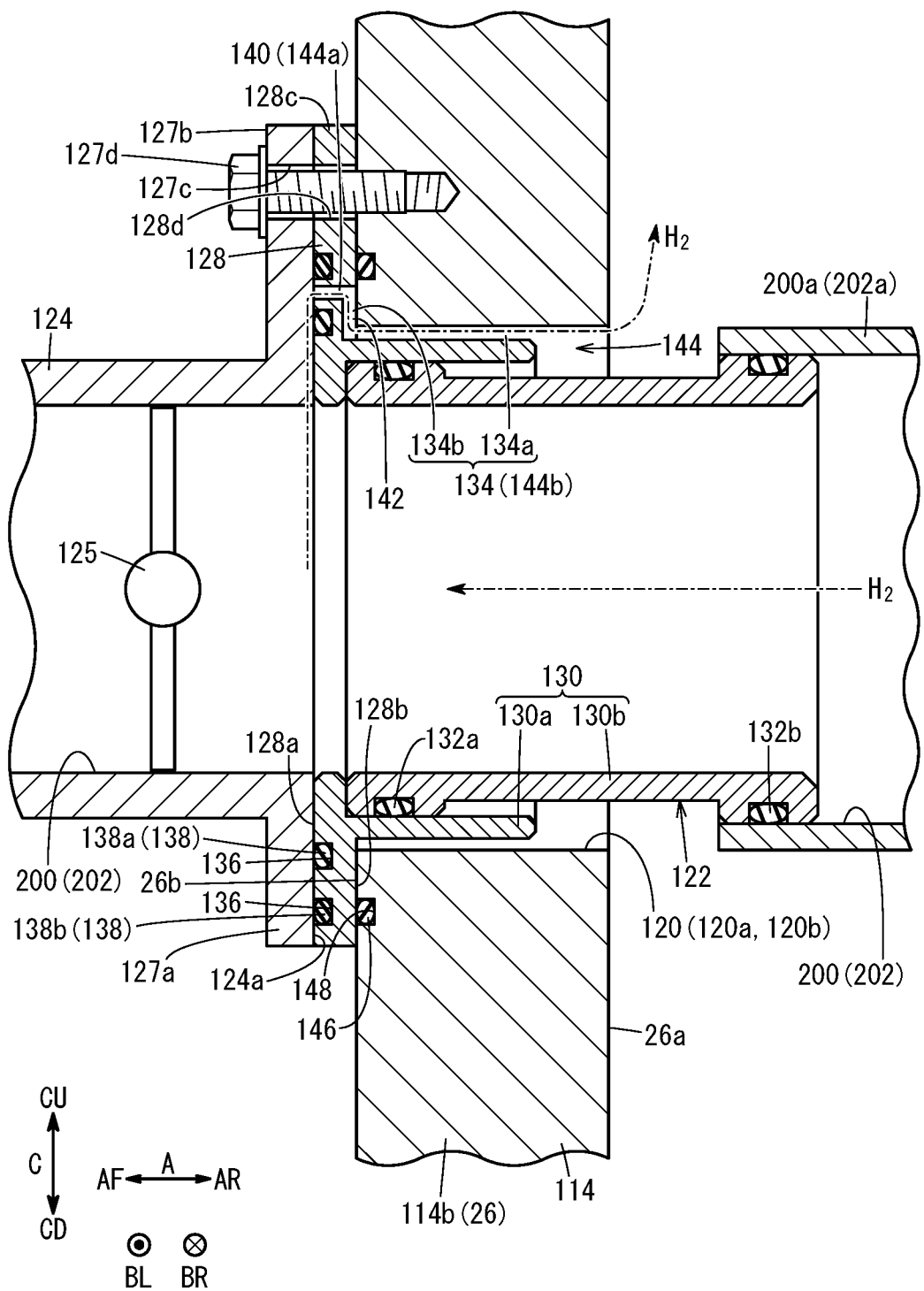
FIG. 4 is a schematic cross section used to explain a connection between an auxiliary machinery case and a reactant gas channel part.

In this embodiment, as will be described later, as shown in FIG. 4, the upstream end of an oxygen-containing gas supply pipe 200a, which forms the oxygen-containing gas supply channel 200 inside the auxiliary machinery case 26, is connected to a reactant gas channel part 124 provided outside of the auxiliary machinery case 26 (case unit 66) through a joint member 122. Further, as will be described later, the downstream end of an oxygen-containing gas discharge pipe 202a, which forms the oxygen-containing gas discharge channel 202 inside the auxiliary machinery case 26, is connected to a reactant gas channel part 124 provided outside of the auxiliary machinery case 26 (case unit 66) through a joint member 122.

As shown in FIG. 3, inside the case unit 66, the air pump 102 and the humidifier 104 are located on the oxygen-containing gas supply channel 200 in this order from the upstream side. Further, the humidifier 104 is located on the oxygen-containing gas discharge channel 202 inside the case unit 66.

The air pump 102 is driven to take in air from the atmosphere as the oxygen-containing gas into the oxygen-containing gas supply channel 200. This air is compressed in the air pump 102 and then supplied to the humidifier 104. The humidifier 104 humidifies the oxygen-containing gas before being supplied into the fuel cell stack 119 (stack 20) through water exchange between the oxygen-containing gas in the oxygen-containing gas supply channel 200 and the exhaust oxygen-containing gas in the oxygen-containing gas discharge channel 202.

As shown in FIG. 3, the fuel gas is supplied into the fuel gas supply channel 208, for example from a hydrogen tank 212 provided outside the case unit 66 and inside the fuel cell vehicle 12 of FIG. 1. The injector 105 and the ejector 106 are located on the fuel gas supply channel 208 in this order from the upstream side. The fuel gas from the hydrogen tank 212 is supplied into the fuel gas inlet passage 56a of the fuel cell stack 119 through the injector 105 and the ejector 106.

The gas-liquid separator 108 is located on the fuel gas discharge channel 210 to separate the exhaust fuel gas into gas and liquid. The exhaust fuel gas discharged from the fuel cell stack 119 into the fuel gas discharge channel 210 is separated into gas component and liquid component (liquid water) in the gas-liquid separator 108. The gas component of the exhaust fuel gas is discharged from a gas discharge outlet 108a of the gas-liquid separator 108 into the ejector 106. As mentioned above, the fuel gas is supplied into the ejector 106 through the injector 105 located upstream. Accordingly, the gas component of the exhaust fuel gas is mixed in the ejector 106 with the fuel gas supplied through the injector 105 and then supplied into the fuel gas inlet passage 56a of the fuel cell stack 119.

The liquid component of the exhaust fuel gas is discharged from a liquid discharge outlet 108b of the gas-liquid separator 108 into a discharge channel 214, and is discharged out of the fuel cell system 10 at the time when a drain valve 109 provided on the discharge channel 214 is opened. The liquid component of the exhaust fuel gas discharged from the fuel cell system 10 may be discharged through, for example, a diluter not shown, to the outside of the fuel cell vehicle 12 of FIG. 1.

As shown in FIGS. 1 and 4, the second case member 114 has case through holes 120 that penetrate through the front wall 114b of the second case member 114 along the front-rear direction. In this embodiment, as shown in FIG. 1, the case through holes 120 include two case through holes 120a and 120b formed vertically (in the arrow C direction) in the second case member 114. The case through holes 120a and 120b can be formed in the same way, and therefore they may be referred to collectively also as case through holes 120 when they are not distinguished particularly.

Reactant gas channel parts 124 are connected respectively to the case through holes 120a, 120b through joint members 122. The reactant gas channel parts 124 are both located outside the auxiliary machinery case 26 (case unit 66).

In this embodiment, the reactant gas channel part 124 that is connected to one case through hole 120a shown in FIGS. 1 and 4 forms, as shown in FIG. 4, an oxygen-containing gas pipe connected to the upstream end of the oxygen-containing gas supply pipe 200a through the joint member 122. In this case, the reactant gas channel part 124 forms part of the oxygen-containing gas supply channel 200 (reactant gas channel). Further, as shown in FIG. 4, the reactant gas channel part 124 connected to the other case through hole 120b shown in FIGS. 1 and 4 is an oxygen-containing gas pipe that is connected to the downstream end of the oxygen-containing gas discharge pipe 202a through the joint member 122. In this case, the reactant gas channel part 124 forms part of the oxygen-containing gas discharge channel 202 (reactant gas channel).

Each reactant gas channel part 124 includes piping and devices (not shown) that are provided outside the case unit 66 to form part of a reactant gas channel for a reactant gas which is the oxygen-containing gas or fuel gas before being supplied into the stack 20 or after being discharged from the stack 20.

The oxygen-containing gas supply channel 200 has a cutoff valve 125 in the upstream part of the reactant gas channel part 124. The oxygen-containing gas discharge channel 202 has a cutoff valve 125 in the downstream part of the reactant gas channel part 124. That is, the cutoff valves 125 are disposed outside the auxiliary machinery case 26 (case unit 66). Alternatively, the cutoff valves 125 may be provided outside the reactant gas channel parts 124 as separate components.

The cutoff valves 125 cut off the oxygen-containing gas supply channel 200 and the oxygen-containing gas discharge channel 202 (which will hereinafter be referred to collectively also as oxygen-containing gas supply/discharge channels 200, 202) from the fuel cell stack 119 when, for example, the fuel cell system 10 is stopped. This prevents oxygen in the air from flowing into the stack 20 through the oxygen-containing gas supply/discharge channels 200, 202 while the fuel cell system 10 is stopped. This improves durability of the electrode catalyst layers etc. (not shown) contained in the anode 48 and cathode 46 of the power generation cell 18 shown in FIG. 2.

As shown in FIG. 4, the reactant gas channel part 124 has an opposing surface 124a that faces a surrounding portion 26b that surrounds the case through hole 120 in the outer wall surface of the auxiliary machinery case 26, with a joint flange 128 of the joint member 122 interposed therebetween. In this embodiment, the opposing surface 124a of the reactant gas channel part 124 is the rear end surface of a pipe flange 127a (its end surface on the arrow AR side) of the reactant gas channel part 124 being an oxygen-containing gas pipe. The pipe flange 127a has a plurality of pipe bolting portions 127b protruding radially outward from the circumference of the pipe flange 127a, and each pipe bolting portion 127b has an insertion hole 127c formed therein. A bolt 127d, described later, is inserted in the insertion hole 127c.

In addition to this joint flange 128, the joint member 122 further has a cylindrical, joint tube 130 that is inserted in the case through hole 120. The joint flange 128 is located at one axial end of the joint tube 130 (at its front end, or the end on the arrow AF side). The case through hole 120 and the joint member 122 are situated so that they extend concentrically when viewed from the arrow A direction.

As explained above, the joint flange 128 is interposed between the surrounding portion 26b of the auxiliary machinery case 26 and the opposing surface 124a of the reactant gas channel part 124. Accordingly, a channel-part-side opposing surface 128a of the joint flange 128, which is its front end surface (on the arrow AF side), faces the opposing surface 124a of the reactant gas channel part 124. Further, a case-side opposing surface 128b of the joint flange 128, which is its rear end surface (on the arrow AR side), faces the surrounding portion 26b of the auxiliary machinery case 26.

In this embodiment, the joint tube 130 includes a first tube 130a having the joint flange 128 and a second tube 130b inserted in the first tube 130a. That is, the joint tube 130 is made by joining the first tube 130a and the second tube 130b prepared as separate members. However, the joint tube 130 may be composed of a single member.

The first tube 130a protrudes rearward (on the arrow AR side) from the case-side opposing surface 128b of the joint flange 128. A length of the first tube 130a in its axial direction (arrow A direction) is shorter than the length of the case through hole 120 in the axial direction. In this embodiment, the outside diameter of the first tube 130a is set to be smaller than the diameter of the case through hole 120.

The front end of the second tube 130b (its end on the arrow AF side) abuts on the joint flange 128 through the inner portion of the first tube 130a. An in-tube seal member 132a is provided between the outer peripheral surface of the front end portion (on the arrow AF side) of the second tube 130b and the inner peripheral surface of the first tube 130a. A length of the second tube 130b in its axial direction (arrow A direction) is longer than the length of the case through hole 120 in the axial direction. The rear end side (arrow AR side) of the second tube 130b, which protrudes from the case through hole 120 into the internal space 26a of the auxiliary machinery case 26, is connected to the oxygen-containing gas supply pipe 200a or oxygen-containing gas discharge pipe 202a, with an out-of-tube seal member 132b interposed therebetween. In this case, the inside of the second tube 130b, too, forms part of the oxygen-containing gas supply/discharge channel 200, 202 (reactant gas channel).

The outside diameter of the second tube 130b is smaller than the outside diameter of the first tube 130a. That is, the outside diameters of the first tube 130a and second tube 130b (joint tube 130) are set to be smaller than the diameter of the case through hole 120. Accordingly, a first gap 134a is formed between the outer peripheral surface of the joint tube 130 and the inner peripheral surface of the case through hole 120, as a gap 134 between the joint member 122 and the auxiliary machinery case 26.

Figure 5:
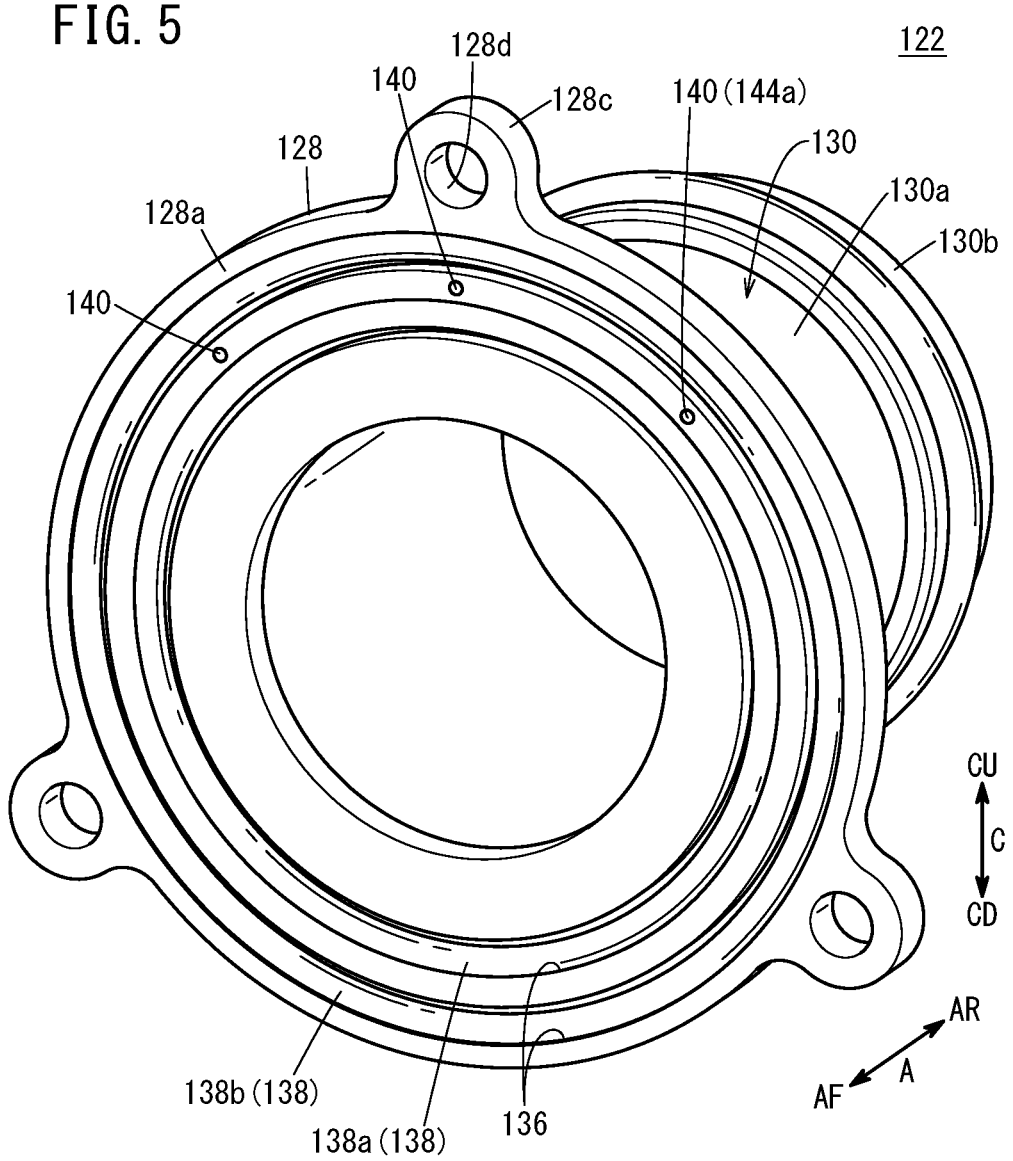
FIG. 5 is a perspective view of a joint member attached to the connection of FIG. 4, which is seen from the side of a joint flange.

As shown in FIGS. 4 and 5, the channel-part-side opposing surface 128a of the joint flange 128 has a plurality of (two in the embodiment) channel seal grooves 136 formed radially side by side so as to form rings in the joint flange 128. Further, channel seal members 138 are fitted respectively in the channel seal grooves 136. That is, as shown in FIG. 4, between the surrounding portion 26b of the auxiliary machinery case 26 and the opposing surface 124a of the reactant gas channel part 124, the plurality of (two in this embodiment) channel seal members 138 are arranged radially side by side in contact with this opposing surface 124a, so as to enclose the case through hole 120. The plurality of channel seal members 138 include an inner seal member 138a disposed closer to the center of the radial direction (closer to the case through hole 120 in the radial direction), and an outer seal member 138b disposed outside in the radial direction (radially farther from the case through hole 120) at an interval from the inner seal member 138a.

The number of the channel seal grooves 136 and channel seal members 138 is not particularly limited to this example, but multiple, two or more, channel seal grooves 136 and channel seal members 138 are provided. When two or more channel seal members 138 are provided, with any two of the channel seal members 138 located radially inside and outside, the one located inside functions as the inner seal member 138a and the other located outside functions as the outer seal member 138b.

Figure 6:
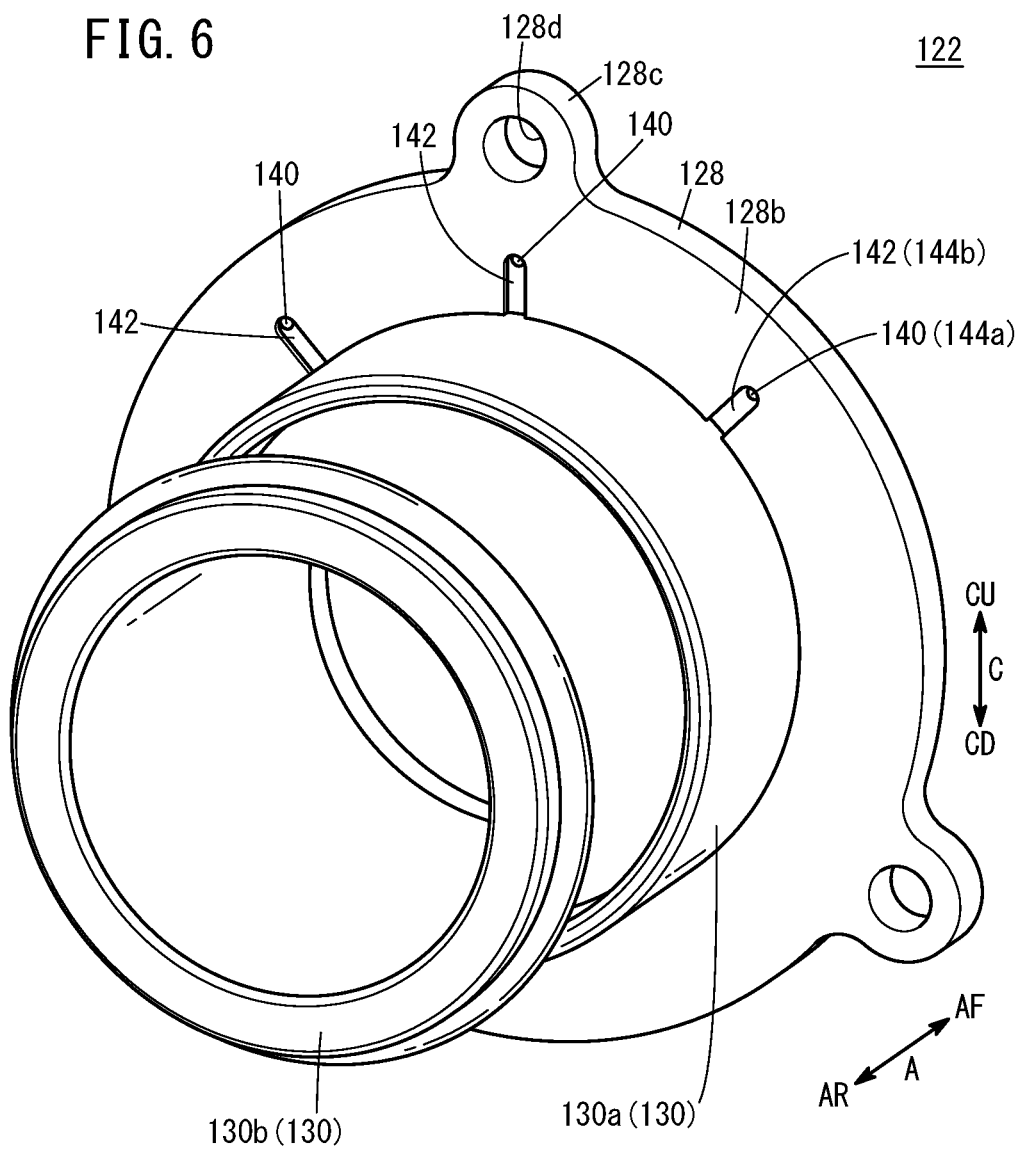
FIG. 6 is a perspective view of the joint member of FIG. 5, seen from the side of a joint tube.

Between the inner seal member 138a and the outer seal member 138b of the joint flange 128, flange through holes 140 penetrate through the joint flange 128 in its thickness direction (the front-rear direction, arrow A direction). As shown in FIGS. 5 and 6, a plurality of (three in this embodiment) flange through holes 140 are formed in an upper area of the joint flange 128 (on the arrow CU side), for example.

As shown in FIG. 4, in the case-side opposing surface 128b of the joint flange 128, flange grooves 142 are formed to allow the first gap 134a and the inside spaces of the flange through holes 140 to communicate with each other. That is, as shown in FIG. 6, the flange grooves 142 radially extend between the flange through holes 140 in the case-side opposing surface 128b and the first tube 130a.

As shown in FIG. 4, between the inside of each flange groove 142 of the joint flange 128 and the surrounding portion 26b of the auxiliary machinery case 26, a second gap 134b is formed as the gap 134 between the joint member 122 and the auxiliary machinery case 26. Each second gap 134b communicates with both of the flange through hole 140 and the first gap 134a. The flange through holes 140 and the gap 134 (the first gap 134a and second gaps 134b) form a connection channel 144. That is, the connection channel 144 includes first channels 144a formed inside the flange through holes 140 and a second channel 144b formed in the gap 134.

If the inner seal member 138a is damaged and its sealing function lowers, the reactant gas in the oxygen-containing gas supply/discharge channel 200, 202 inside the reactan gas channel part 124 and joint member 122 may flow, as shown by one-dot chain arrow in FIG. 4, along the opposing surface 124a of the reactant gas channel part 124 past the inner seal member 138a toward the outer seal member 138b. If the reactant gas thus flows from the inner seal member 138a toward the outer seal member 138b, the reactant gas is guided into the internal space 26a of the auxiliary machinery case 26 through the connection channel 144.

By the way, when the fuel cell system 10 is not operating, the fuel gas in the fuel gas flow field 60 of FIG. 2, for example, may permeate through the electrolyte membrane 44 into the oxygen-containing gas flow field 58. In this case, the fuel gas, which contains hydrogen gas ($H_2$), is present also in the oxygen-containing gas supply/discharge channel 200, 202 that communicates with the oxygen-containing gas flow field 58. Accordingly, the reactant gas, which has been guided from the oxygen-containing gas supply/discharge channel 200, 202 into the internal space 26a of the auxiliary machinery case 26 through the connection channel 144, may contain the fuel gas.

As shown in FIG. 4, a case seal member 146 is interposed between the case-side opposing surface 128b of the joint flange 128 and the surrounding portion 26b of the auxiliary machinery case 26, in a position radially outside of the flange through holes 140 in the case-side opposing surface 128b of the joint flange 128. In this embodiment, the case seal member 146 is fitted in a case seal groove 148 formed in the surrounding portion 26b of the auxiliary machinery case 26.

As shown in FIGS. 4 to 6, a plurality of joint bolting portions 128c protrude radially outward from the circumference of the joint flange 128, and each joint bolting portion 128c has an insertion hole 128d formed therein. As shown in FIG. 4, each joint bolting portion 128c and the aforementioned pipe bolting portion 127b are fastened together to the auxiliary machinery case 26 by the bolts 127d, with the joint bolting portion 128c and the pipe bolting portion 127b being stacked so that their respective insertion holes 127c and 128d are aligned with each other concentrically.

The bottom of the case unit 66 of FIG. 1 has a ventilation hole (not shown) formed therethrough so that air can flow into the case unit 66 through the ventilation hole. Further, right-hand duct communication holes 152R are formed respectively in two of the four corners of the top wall of the case unit 66 (the two on the right-hand side or arrow BR side). Further, left-hand duct communication holes 152L are formed respectively in two of the four corners (the two on the left-hand side or arrow BL side). That is, the right-hand duct communication holes 152R penetrate through the top wall of the stack case 22 (surrounding wall case 68) and the left-hand duct communication holes 152L penetrate through the top wall of the auxiliary machinery case 26 (second case member 114).

A stack-side exhaust duct 154 is connected to the right-hand duct communication holes 152R formed in the stack case 22. Accordingly, the right-hand duct communication holes 152R allow the internal space 22a of the stack case 22 to communicate with the stack-side exhaust duct 154. Further, an auxiliary-machinery-side exhaust duct 156 is connected to the left-hand duct communication holes 152L formed in the auxiliary machinery case 26. Accordingly, the left-hand duct communication holes 152L allow the internal space 26a of the auxiliary machinery case 26 to communicate with the auxiliary-machinery-side exhaust duct 156.

The stack-side exhaust duct 154 and the auxiliary-machinery-side exhaust duct 156 are connected to a connection exhaust duct 158. The left end of the connection exhaust duct 158 (its end on the arrow BL side) is connected to a left exhaust hole 162L formed in a left fender 160L of the fuel cell vehicle 12. The right end of the connection exhaust duct 158 (its end on the arrow BR side) is connected to a right exhaust hole 162R formed in a right fender 160R of the fuel cell vehicle 12. That is, the connection exhaust duct 158 communicates with the outside of the fuel cell vehicle 12 through the left exhaust hole 162L and right exhaust hole 162R.

Thus, if the fuel gas leaks from the stack 20, fuel cells' auxiliary machinery 24, etc., then the leaked fuel gas is discharged out of the fuel cell vehicle 12 through at least one of the internal space 22a of the stack case 22 and the internal space 26a of the auxiliary machinery case 26, at least one of the stack-side exhaust duct 154 and the auxiliary-machinery-side exhaust duct 156, and the connection exhaust duct 158.

Next, operations of the fuel cell system 10 constructed as described above will be described. As shown in FIG. 1, the fuel cell system 10 generates electric power while the fuel cell vehicle 12 is operated. In this case, the fuel gas supplied into the fuel gas supply channel 208 from the hydrogen tank 212 of FIG. 3 is supplied through the injector 105 and the ejector 106 into the fuel gas inlet passage 56a of FIG. 2 of the fuel cell stack 119.

Further, the oxygen-containing gas is fed into the oxygen-containing gas supply channel 200 under the operation of the air pump 102 of FIG. 3. The oxygen-containing gas is supplied into the oxygen-containing gas inlet passage 52a of FIG. 2 of the fuel cell stack 119 through the cutoff valve 125 being opened, the reactant gas channel part 124 connected to the case through hole 120a of FIG. 1, and the humidifier 104 of FIG. 3. Also, the coolant is supplied into the coolant inlet passage 54a of FIG. 2 of the fuel cell stack 119 through the coolant supply channel 204 of FIG. 3.

As shown in FIG. 2, the fuel gas supplied into the fuel gas inlet passage 56a is introduced into the fuel gas flow field 60 in the second separator 42 and flows along the anode 48. The oxygen-containing gas supplied into the oxygen-containing gas inlet passage 52a is introduced into the oxygen-containing gas flow field 58 in the first separator 40 and flows along the cathode 46.

In the membrane electrode assembly 38, the fuel gas supplied to the anode 48 and the oxygen-containing gas supplied to the cathode 46 are consumed by the electrochemical reactions in the electrode catalyst layers to generate electric power. The fuel cell vehicle 12 (FIG. 1) can run by using the electric power.

Exhaust fuel gas, which is the remaining fuel gas unused in the electrochemical reaction, is discharged from the fuel gas outlet passage 56b into the exhaust fuel gas channel of FIG. 3, and separated into gas component and liquid component in the gas-liquid separator 108. Then, the gas component is supplied via the ejector 106 into the fuel gas inlet passage 56a of FIG. 2 together with the fuel gas from the hydrogen tank 212, and is used in the electrochemical reaction. The liquid component is discharged into the discharge channel.

The exhaust oxygen-containing gas, or the oxygen-containing gas in which oxygen has been consumed in the electrochemical reaction, is discharged from the oxygen-containing gas outlet passage 52b of FIG. 2 into the oxygen-containing gas discharge channel 202 of FIG. 3. This exhaust oxygen-containing gas is discharged out of the fuel cell system 10 through the humidifier 104, the reactant gas channel part 124 connected to the case through hole 120b of FIG. 1, and the cutoff valve 125 being opened.

The coolant supplied into the coolant inlet passage 54a flows through the coolant flow field 62 to cool the membrane electrode assembly 38 and is then discharged from the coolant outlet passage 54b into the coolant discharge channel 206.

As shown in FIG. 1, in the case unit 66, the fuel gas may leak from the stack 20 (sandwiched body 36), fuel cells' auxiliary machinery 24, etc. The leaked fuel gas is a gas that contains hydrogen and hence lighter in weight than air, and so it tends to flow upward in the case unit 66. Accordingly, the leaked fuel gas accommodated in the internal space 22a of the case unit 66 flows into the stack-side exhaust duct 154 or the auxiliary-machinery-side exhaust duct 156 through the right-hand duct communication holes 152R or left-hand duct communication holes 152L formed in the top wall of the case unit 66, and is then guided out of the fuel cell vehicle 12 through the connection exhaust duct 158. As a result, the inside of the case unit 66 (stack case 22 and auxiliary machinery case 26) is ventilated.

As has been mentioned above, while the fuel cell system 10 is not operating, for example, the fuel gas in the fuel gas flow field 60 of FIG. 2 may permeate through the electrolyte membrane 44 to reach the oxygen-containing gas flow field 58 and flow into the oxygen-containing gas supply/discharge channel 200, 202.

According to the fuel cell system 10 of this embodiment, the plurality of channel seal members 138 are arranged radially side by side between the surrounding portion 26b of the auxiliary machinery case 26 (case) and the opposing surface 124a of the reactant gas channel part 124, and the plurality of channel seal members 138 seal the connection between the auxiliary machinery case 26 and the reactant gas channel part 124. Further, the plurality of channel seal members 138 include the inner seal member 138a disposed closer to the center in the radial direction, and the outer seal member 138b disposed closer to the outer side in the radial direction at an interval from this inner seal member 138a. Furthermore, the connection channel 144 communicating with the internal space 26a of the auxiliary machinery case 26 opens between the inner seal member 138a and the outer seal member 138b.

The presence of the plurality of seal members effectively prevents the reactant gas (especially, fuel gas) in the oxygen-containing gas supply/discharge channel 200, 202 from leaking from the connection between the auxiliary machinery case 26 and the reactant gas channel part 124. Furthermore, for example, even if the sealing function of the inner seal member 138a is damaged and the reactant gas in the oxygen-containing gas supply/discharge channel 200, 202 flows, as shown by one-dot chain arrow in FIG. 4, past the inner seal member 138a toward the outer seal member 138b, the reactant gas can be guided out into the internal space 26a in the auxiliary machinery case 26 through the connection channel 144. That is, it is possible to effectively prevent the reactant gas from further flowing past the outer seal member 138b to leak out of the connection.

As can be understood from the description above, the fuel cell system 10 can prevent reactant gases from leaking from connections between the reactant gas channel parts 124 and the auxiliary machinery case 26, without the need to, for example, additionally provide the auxiliary machinery case 26 etc. with some cover means for shielding the connections between the auxiliary machinery case 26 and reactant gas channel parts 124, that is, without increasing the size of the auxiliary machinery case 26 (case). As a result, it is possible, even if the fuel gas enters the oxygen-containing gas supply/discharge channel 200, 202, to prevent the fuel gas from leaking out of the case unit 66. This, in turn, makes it possible to avoid the situation where the concentration of the fuel gas increases over a certain value in the space outside of the case unit 66, within the space in which the fuel cell system 10 is installed in the fuel cell vehicle 12.

According to the embodiment above, the fuel cell system 10 includes the joint member 122 including the cylindrical joint tube 130 and the joint flange 128 that is provided at one end of the joint tube 130 in the axial direction. The opposing surface 124a of the reactant gas channel part 124 faces the surrounding portion 26b of the auxiliary machinery case 26 (case), with the joint flange 128 interposed therebetween, and the joint tube 130 is inserted in the case through hole 120. The joint flange 128 has the flange through holes 140 that penetrate through the joint flange 128 in the thickness direction thereof, in positions between the inner seal member 138a and the outer seal member 138b in the radial direction. The connection channel 144 includes the first channels 144a formed inside the flange through holes 140, and the second channel 144b formed in the gap 134 between the joint member 122 and the auxiliary machinery case 26.

In this way, the joint member 122 is disposed between the reactant gas channel part 124 and the auxiliary machinery case 26, and the first channels 144a of the connection channel 144 are formed inside the flange through holes 140 of the joint member 122. It is thus possible to provide the plurality of channel seal members 138 and the connection channel 144 easily, without considerably changing the existing configurations etc. of the reactant gas channel part 124 and the auxiliary machinery case 26 (case) themselves.

According to the fuel cell system 10 of the embodiment, the joint flange 128 has the channel-part-side opposing surface 128a facing the opposing surface 124a of the reactant gas channel part 124, and the case-side opposing surface 128b facing the surrounding portion 26b of the auxiliary machinery case 26 (case). The gap 134 includes the first gap 134a formed between the outer peripheral surface of the joint tube 130 and the inner peripheral surface of the case through hole 120, and the second gaps 134b formed in the flange grooves 142 formed in the case-side opposing surface 128b so as to allow the first gap 134a and the flange through holes 140 to communicate with each other. In this case, the second channel 144b of the connection channel 144 can be formed by a simple configuration. Further, if reactant gas flows past the inner seal member 138a toward the outer seal member 138b, the reactant gas can be reliably guided into the internal space 26a of the auxiliary machinery case 26.

Figure 7:
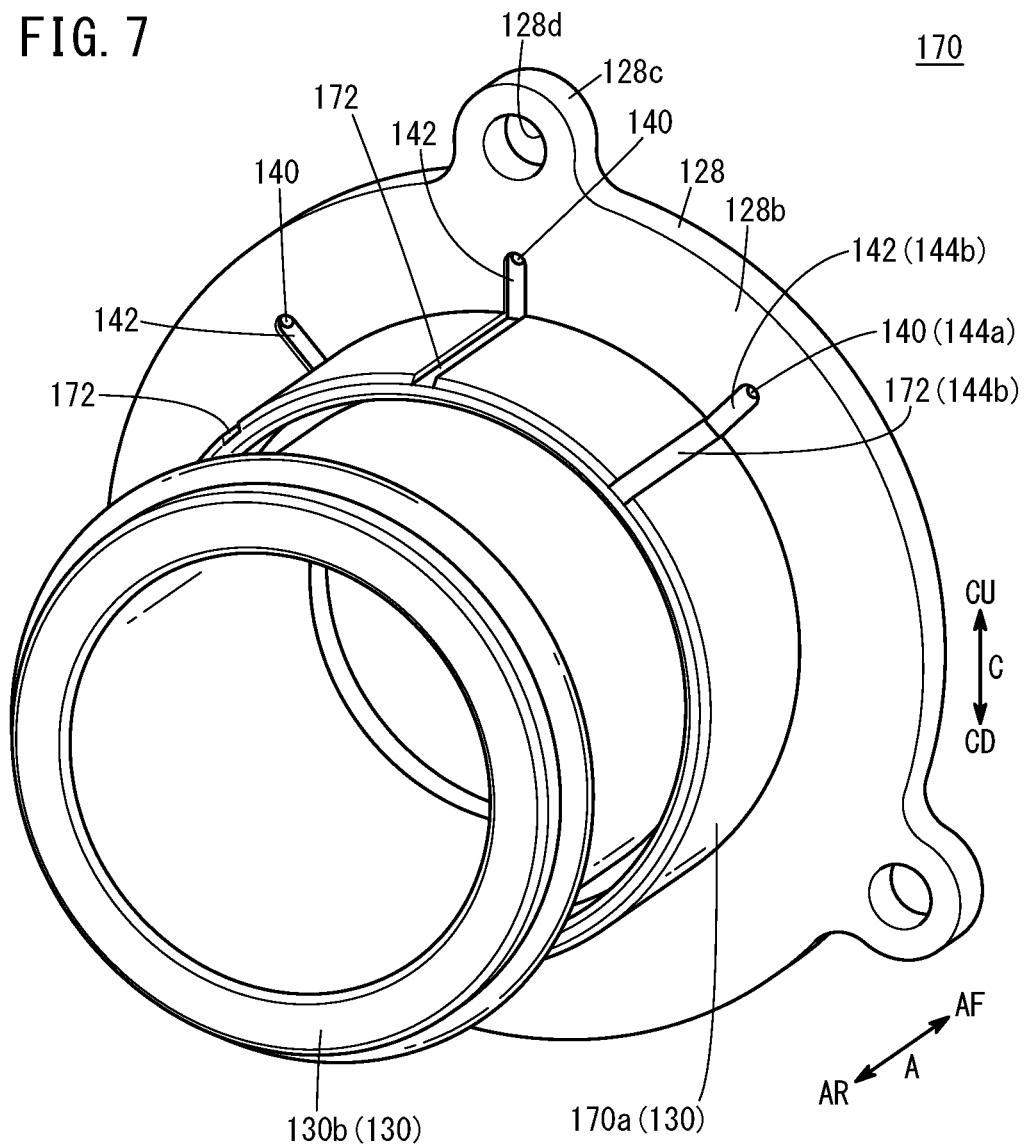
FIG. 7 is a perspective view of a joint member according to a modification, which is seen from the side of the joint tube.

The embodiment above has described that the outside diameter of the joint tube 130 is set smaller than the diameter of the case through hole 120 so as to form the first gap 134a, but the configuration thereof is not particularly limited to this example. For instance, as shown in FIG. 7, a joint member 170 according to a modification includes a first tube 170a having substantially the same outside diameter as the case through hole 120 of FIG. 4. The joint member 170 of FIG. 7 is constructed in the same way as the joint member 122 of FIG. 6 except that it includes the first tube 170a of FIG. 7 in place of the first tube 130a of FIG. 6.

Cuts 172 are formed in the outer peripheral surface of the first tube 170a to extend along the axial direction (arrow A direction). One end (front end) of the length of each cut 172 communicates with the inside of the flange groove 142. The other end (rear end) of the length of each cut 172 communicates with the clearance between the outer peripheral surface of the second tube 130b and the inner peripheral surface of the case through hole 120. With the joint member 170 constructed in this way, the first gap 134a is formed between the cuts 172 of the first tube 170a and the inner peripheral surface of the case through hole 120 shown in FIG. 4 and between the outer peripheral surface of the second tube 130b and the inner peripheral surface of the case through hole 120 as shown in FIG. 4.

With the connection channel 144 formed in this way in the first gap 134a, the second gaps 134b, and the flange through holes 140, too, even if reactant gas flows past the inner seal member 138a toward the outer seal member 138b, the reactant gas can be reliably guided into the internal space 26a of the auxiliary machinery case 26. The cuts 172 may be formed in the outer peripheral surface of a first tube 130a that has an outside diameter smaller than the diameter of the case through hole 120.

In the fuel cell system 10 above, the case seal member 146 for providing a seal between the joint flange 128 and the auxiliary machinery case 26 (case) is provided on the outer side of the flange through holes 140 in the radial direction. In this case, it is possible to reliably provide a seal between the joint flange 128 and the surrounding portion 26b of the auxiliary machinery case 26 to prevent leakage of the fuel gas further effectively, without interfering with the passage of the fuel gas through the connection channel 144.

The present invention is not limited to the embodiments described above, and various modifications are possible without departing from the essence and gist of the invention.

Figure 8:
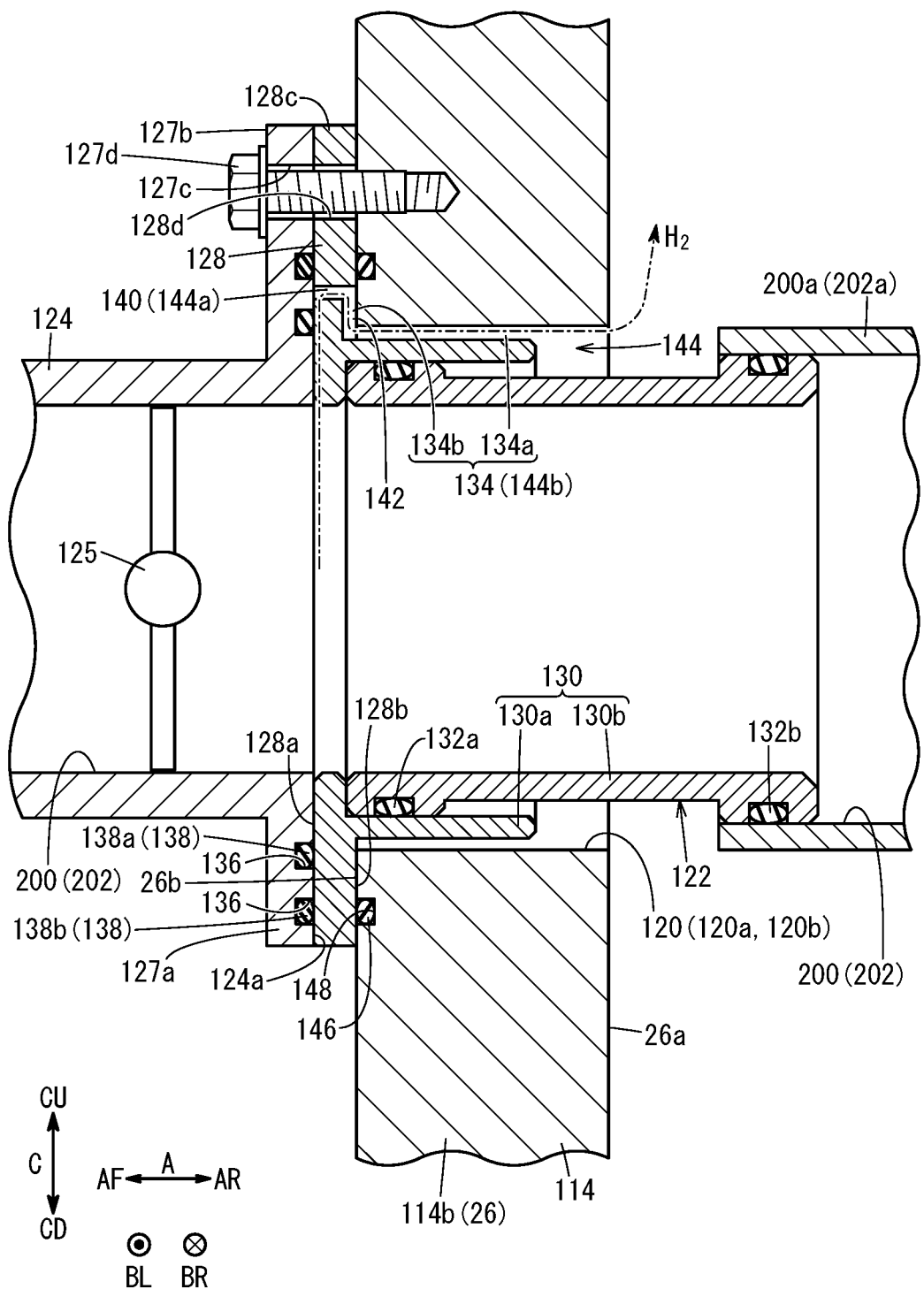
FIG. 8 is a schematic cross section used to explain a connection between the auxiliary machinery case and reactant gas channel part according to a modification.

For example, in the embodiments, as shown in FIGS. 4 and 5, the channel seal grooves 136 are formed in the channel-part-side opposing surface 128a of the joint flange 128. However, as shown in FIG. 8, the channel seal grooves 136 may be formed in the opposing surface 124a of the reactant gas channel part 124.

In the embodiments above, as shown in FIG. 4, the case seal groove 148 is formed in the surrounding portion 26b of the auxiliary machinery case 26. However, as shown in FIG. 9, the case seal groove 148 may be formed in the case-side opposing surface 128b of the joint flange 128.

In the embodiments above, as shown in FIG. 4, the flange grooves 142, for allowing the first gap 134a and the inner spaces of the flange through holes 140 to communicate with each other, are formed in the case-side opposing surface 128b of the joint flange 128. However, the flange grooves 142 may be absent in the case-side opposing surface 128b of the joint flange 128.

Figure 9:
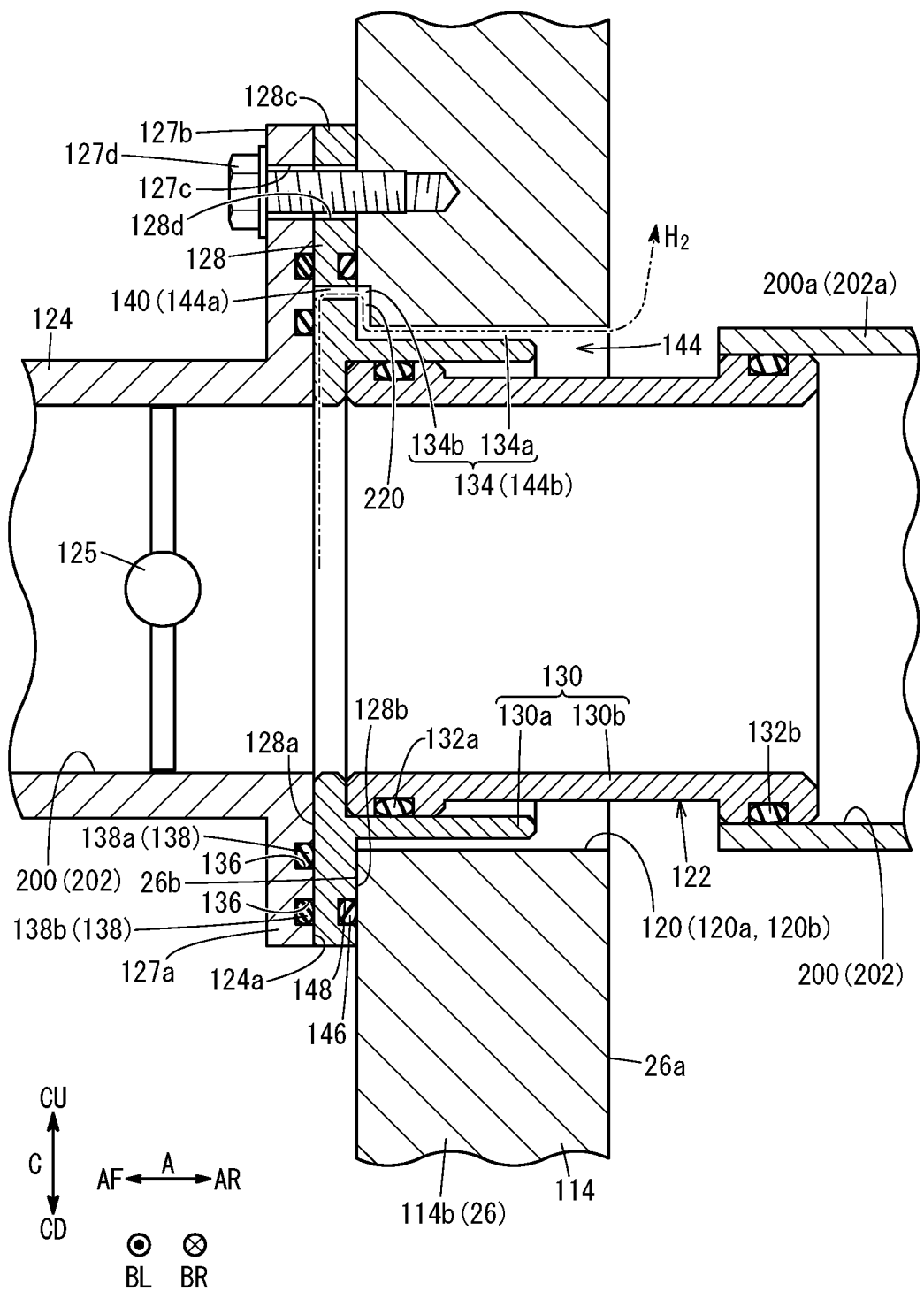
FIG. 9 is a schematic cross section used to explain a connection between the auxiliary machinery case and reactant gas channel part according to another modification.

In this case, as shown in FIG. 9, case grooves 220 are formed in the surrounding portion 26b of the auxiliary machinery case 26 in order to allow the first gap 134a and the inner spaces of the flange through holes 140 to communicate with each other. That is, the case grooves 220 are formed in the surrounding portion 26b to radially extend between the flange through holes 140 and the case through hole 120. The second gaps 134b are formed as the gap 134 between the joint member 122 and the auxiliary machinery case 26 between the inner spaces of the case grooves 220 and the case-side opposing surface 128b of the joint flange 128.

In the embodiments above, as shown in FIG. 1, the auxiliary machinery case 26 has two case through holes 120, and the reactant gas channel parts 124 are connected respectively to these case through holes 120. However, the structure is not particularly limited to this example. For instance, a reactant gas channel part 124 may be connected to only one of the two case through holes 120.

Further, the case through holes 120 may be formed in the same way not in the auxiliary machinery case 26 but in the stack case 22, and reactant gas channel parts 124 may be connected to the case through holes 120.

Furthermore, case through holes 120 may be formed in one case (not shown) that accommodates the stack 20 (sandwiched body 36) and the fuel cells' auxiliary machinery 24, in the same way as in the auxiliary machinery case 26, and the reactant gas channel parts 124 may be connected to the case through holes 120.

What is claimed is:

1. A fuel cell system including a stack of a plurality of fuel cells for generating electric power through an electrochemical reaction between a fuel gas and an oxygen-containing gas, and a case for accommodating at least one of the stack and auxiliary machinery of the fuel cells, the case having a case through hole penetrating through a wall of the case, the fuel cell system comprising:
    a reactant gas channel part provided outside the case, the reactant gas channel part being connected to the case through hole and forming a reactant gas channel configured to allow a reactant gas being the fuel gas or the oxygen-containing gas to flow; and
    a plurality of channel seal members disposed side by side in a radial direction of the case through hole between the case and the reactant gas channel part, and surrounding the case through hole,
    the reactant gas channel part having an opposing surface that faces a surrounding portion of an outer wall surface of the case that surrounds the case through hole,
    the plurality of channel seal members including an inner seal member abutting on the opposing surface and an outer seal member disposed on an outer side of the inner seal member in the radial direction to abut on the opposing surface, and
    a connection channel being formed between the inner seal member and the outer seal member in a manner that the connection channel communicates with an internal space of the case.

2. The fuel cell system according to claim 1, further comprising a joint member including a cylindrical, joint tube and a joint flange that is provided at one end of the joint tube in an axial direction of the joint tube,
    wherein the opposing surface of the reactant gas channel part faces the surrounding portion of the case with the joint flange interposed between the opposing surface and the surrounding portion,
    the joint tube is inserted in the case through hole,
    the joint flange has at least one flange through hole that penetrates through the joint flange in a thickness direction of the joint flange, in a position between the inner seal member and the outer seal member in the radial direction, and
    the connection channel includes a first channel formed inside the flange through hole and a second channel formed in a gap between the joint member and the case.

3. The fuel cell system according to claim 2, wherein the joint flange has a channel-part-side opposing surface facing the opposing surface of the reactant gas channel part and a case-side opposing surface facing the surrounding portion of the case, and
    the gap includes a first gap formed between an outer peripheral surface of the joint tube and an inner peripheral surface of the case through hole, and a second gap formed in a flange groove that is formed in the case-side opposing surface so as to allow the first gap and the flange through hole to communicate with each other.

4. The fuel cell system according to claim 3, wherein a case seal member for providing sealing between the joint flange and the case is provided on an outer side of the flange through hole in the radial direction.

* * * * *